Sept. 2, 1952 A. E. BACHELET 2,609,455
TELEPHONE SYSTEM
Filed Nov. 30, 1949
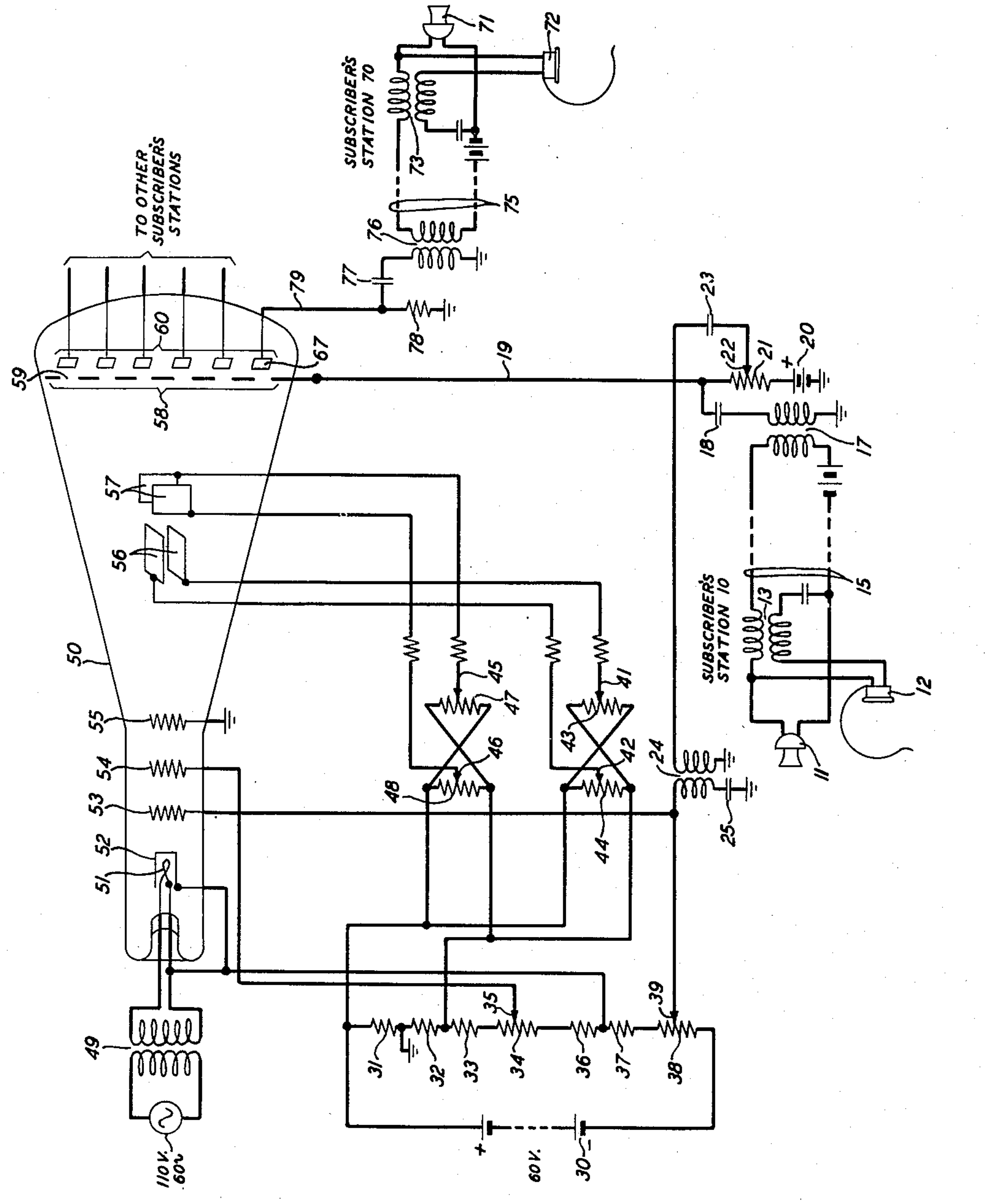
INVENTOR
A. E. BACHELET
BY R. D. Covell
ATTORNEY Patented Sept. 2, 1952

2,609,455

UNITED STATES PATENT OFFICE 2,609,455

TELEPHONE SYSTEM

Albert E. Bachelet, New York, N. Y., assignor to Bell Telephone Laboratories, Incorporated, New York, N. Y., a corporation of New York Application November 30, 1949, Serial No. 130,281

2 Claims. (Cl. 179—18)

This invention relates to telephone systems and particularly to electronic means for switching transmission paths to complete desired connections between telephone stations.

Objects of the invention are the provision of electronic switching means for selectively establishing desired telephone transmission connections and an increase in the efficiency of the transmission of established connections.

This invention is a telephone system in which a multitarget electric beam tube individually connected to one telephone transmission channel is selectively controlled to establish a two-way connection with any desired one of a plurality of other telephone transmission channels.

A feature of the invention is a multitarget electron beam tube constituting a two-way transmission network interconnecting one transmission channel with any desired one of a plurality of other transmission channels, the transmission loss in the tube being compensated for by regenerative feedback thereby introducing amplification in both directions.

The drawing, which consists of a single figure shows schematically a telephone system embodying the invention and its various features.

The telephone system shown in the drawing includes a multitarget electron beam tube 50 for selectively establishing two-way conversational connections between a telephone station 10 and any one of a plurality of other telephone stations, one of which is the station 70. The electron beam tube 50 may be individual to the subscriber station 10; or the tube 50 may be common to a plurality of stations, including the station 10; and in this case any one of the stations may be individually connected to the tube 50 by switching means (not shown), for instance by an operator's cord or by automatically operated line finder and selector switches.

The electron beam tube 50 may be similar in structure to the tube disclosed in detail in Patent 2,452,157 granted to R. W. Sears, October 26, 1948. The tube 50 comprises an evacuated vitreous enclosing vessel having an electron gun at one end and a plurality of target electrodes at the other end. The various elements of the tube are shown schematically and the supports and leading-in conductors connected to these elements are omitted. The target electrodes may be positioned in a straight line, in a circle or in horizontal and vertical rows. The electron gun is of conventional construction and comprises a cathode 52, a cathode heating filament 51 connected to an external alternating-current source 49 of required voltage, a beam modulating or control electrode 53, and focussing and accelerating anodes 54 and 55. Horizontal and vertical pairs of deflecting plates 56 and 57 are mounted between the accelerating anodes and target anodes and the electron gun when energized projects a concentrated electron beam through the anodes 54 and 55 and centrally between each of the pairs of deflecting plates toward the target anodes at the other end of the tube. By applying required potentials to each of the two pairs of deflecting plates, the beam may be selectively deflected toward any desired one of the target anodes 60. The target anodes are composed of, or coated with, a material having a high coefficient of secondary electron emission; and a grid or shield electrode 58 positioned in front of the target anodes has apertures 59 therethrough aligned with these anodes, the shield and target anodes being constructed as described in the aforementioned patent to Sears so that the concentrated electron beam passes through the shield to any desired one of the targets. The shield electrode 58, which is treated in ways known in the art to minimize secondary emission, is maintained at a positive potential and the electrons emitted from any target anode on which the electron beam impinges are collected by the shield as hereinafter described.

The subscriber telephone stations may be of any known type. As shown in the drawing, station 10 comprises a telephone transmitter 11, receiver 12 and induction coil 13 and is connected by line 15, induction coil 17, condenser 18 and conductor 19 to the shield electrode 58 of tube 50. The station 70 comprises a telephone transmitter 71, a receiver 72, and induction coil 73 and is connected by line 75, induction coil 76, condenser 77 and conductor 79 to the target anode 67 of beam tube 50. Similar stations are connected, one to each other target anode of tube 50 in like manner to that in which station 70 is connected.

The controlling means for selectively operating tube 50 to connect station 10 with any desired one of a plurality of other telephone stations includes a battery 30 of suitable voltage and a conventional voltage divider arrangement consisting of resistors 31 to 38 in series as shown in the drawing, the junction between resistors 31 and 32 being connected to ground. The cathode 52 is connected through resistors 37 and 38 to the negative pole of battery 30 and each of the target anodes 60 is individually connected to ground in similar manner to that in which anode 67 is connected to ground; so that the anodes are positive with respect to the cathode. The beam modulating or control electrode 53 is variably connected by contact arm 39 through a desired portion of resistor 38 to the negative pole of battery 30 so as to introduce the desired amount of negative bias for controlling the intensity of the electron beam. The focussing and accelerating anode 54 is variably connected by contact arm 35 to resistor 34, whereby anode 54 is rendered positive with respect to the cathode 52 thereby to concentrate and accelerate the electrons emanating from the cathode. The anode 55, which is connected to ground potential, is also positive with respect to cathode 52 so as to further accelerate and concentrate the electron beam which passes anode 54. The horizontal pair of deflecting plates 56 are variably connected through contact arms 41 and 42 and resistors 43 and 44 to impress the particular difference in potential across plates 56 required for deflecting the electron beam vertically, the required deflection depending upon the vertical position of the target anode which is connected to the called station. The vertical pair of deflecting plates 57 are variably connected through contact arms 45 and 46 and resistors 47 and 48 to impress the particular difference in potential across plates 57 required for deflecting the electron beam horizontally, the required deflection depending upon the horizontal position of the target anode which is connected to the called station. This balanced potentiometer method of controlling the desired vertical and horizontal deflection of the electron beam is conventional. The setting of the contact arms 41, 42, 45 and 46 to obtain the desired beam deflection may be a manual setting or can be an automatic setting under the control of the subscriber at station 10. The shield electrode 58 is connected through resistor 21 to the positive pole of battery 20 and, since the negative pole of battery 20 is connected to ground and each of the target anodes is connected through a resistor to ground, the shield 58 is positive with respect to the target anodes and serves as a collector for electrons emitted from the one of the anodes 60 upon which the electron beam impinges; and the current between the selected target anode 60 and shield 58 constitutes part of a two-way transmission channel between the calling station 10 and the station connected to the selected target anode.

Assuming the balanced potentiometers comprising contact arms 41, 42, 45 and 46 to have been positioned to deflect the electron beam to impinge on the target anode 67 which is connected by conductor 79 to resistor 78 and also through condenser 77 to induction coil 76, a two-way talking connection is established between station 10 and station 70, the transmission path being traced from ground through the right winding of induction coil 17, condenser 18, conductor 19, shield 58, the energized target anode, conductor 79, condenser 77, and the left winding of induction coil 76 to ground.

In order to compensate for transmission loss in tube 50, a regenerative feedback connection is provided from the two-way transmission channel, between shield electrode 58 and the particular target anode 60 on which the electron beam impinges, to the control grid 53. This feedback connection includes the induction coil 24, the left winding of induction coil 24 being connected to anode 53 in series with blocking condenser 25 and the right winding of induction coil 24 being connected through blocking condenser 23 and contact arm 22 to a desired point on resistor 21. The induction coil 24 constitutes an impedance matching connecting element and introduces a 180-degree phase shift between the potential variations in conductor 19 and the feedback voltage applied to electrode 53; whereby the intensity of the electron beam is increased and two-way amplification is effected with a minimum of transmission loss. The amount of feedback can be varied by moving the contact arm 22 to increase or decrease the feedback voltage.

What is claimed is:

1. In a telephone system comprising a plurality of telephone stations, an electron beam tube comprising a plurality of secondary electron emissive target anodes, means for selectively projecting an electron beam toward any desired one of said target anodes to effect energization of said one anode, a shield electrode having apertures for passing the beam to each of said target anodes, means individually connecting said shield electrode to one of said telephone stations, and means individually connecting each of said target anodes to a different one of other telephone stations, said shield and the energized one of said target anodes in combination with said individually associated connecting means constituting a two-way talking connection between said one station and the other station which is connected to the energized target anode.

2. In a telephone system comprising a plurality of telephone stations, an electron beam tube for establishing two-way talking connections between telephone stations, said tube comprising a plurality of secondary electron emissive target anodes, means for projecting an electron beam toward any one of said target anodes to effect the selective energization of any desired one of said target anodes, a control electrode for controlling the intensity of said electron beam, and a shield electrode having apertures therein aligned with said target anodes for passing the beam to said target anodes, means for maintaining said shield electrode positive with respect to said anodes, means individually connecting said shield electrode to one of said telephone stations, means individually connecting each of said target anodes to a different one of other telephone stations, said shield and the energized one of said target anodes in combination with said individually associated connecting means constituting a two-way talking connection between said one station and the other station which is connected to the energized target anode, and means interconnecting said control electrode and said shield electrode for regeneratively feeding back energy from said talking connection to the control electrode of said tube to increase the intensity of said beam.

ALBERT E. BACHELET.

REFERENCES CITED

The following references are of record in the file of this patent:

UNITED STATES PATENTS

| Number | Name | Date |
| --- | --- | --- |
| 2,224,677 | Hanscom | Dec. 10, 1940 |
| 2,379,221 | Espenschied | June 26, 1945 |
| 2,462,896 | Ransom | Mar. 1, 1949 |